(12) United States Patent
Bunczek

(10) Patent No.: US 9,883,688 B1
(45) Date of Patent: Feb. 6, 2018

(54) METHOD FOR MAKING CITRUS JUICE POWDER

(71) Applicant: GRIFFITH FOODS INTERNATIONAL INC., Alsip, IL (US)

(72) Inventor: Michael T. Bunczek, Lisle, IL (US)

(73) Assignee: GRIFFITH FOODS INTERNATIONAL INC., Alsip, IL (US)

( * ) Notice: Subject to any disclaimer, the term of this patent is extended or adjusted under 35 U.S.C. 154(b) by 0 days.

(21) Appl. No.: 15/145,478

(22) Filed: May 3, 2016

Related U.S. Application Data

(60) Provisional application No. 62/157,827, filed on May 16, 2015.

(51) Int. Cl.
*A23L 1/2165* (2006.01)
*A23L 2/10* (2006.01)
*A23L 1/314* (2006.01)

(52) U.S. Cl.
CPC ............. *A23L 2/10* (2013.01); *A23L 1/31436* (2013.01); *A23V 2002/00* (2013.01)

(58) Field of Classification Search
CPC ... A23L 1/31436; A23L 2/10; A23V 2200/06; A23V 2250/032
USPC ................................ 426/589, 599, 616, 652
See application file for complete search history.

(56) References Cited

U.S. PATENT DOCUMENTS

2007/0059423 A1* 3/2007 Toledo ..................... A23B 4/12
426/589

* cited by examiner

*Primary Examiner* — Helen F Heggestad
(74) *Attorney, Agent, or Firm* — Michael Best & Friedrich LLP

(57) ABSTRACT

Disclosed are improved citrus fruit juice powders and methods of providing the improved citrus fruit juice powders. The citrus fruit juice powders are neutralized and are free of fillers, such as maltodextrin. Also disclosed are meat marinades that include the improved citrus fruit juice powder.

16 Claims, 1 Drawing Sheet

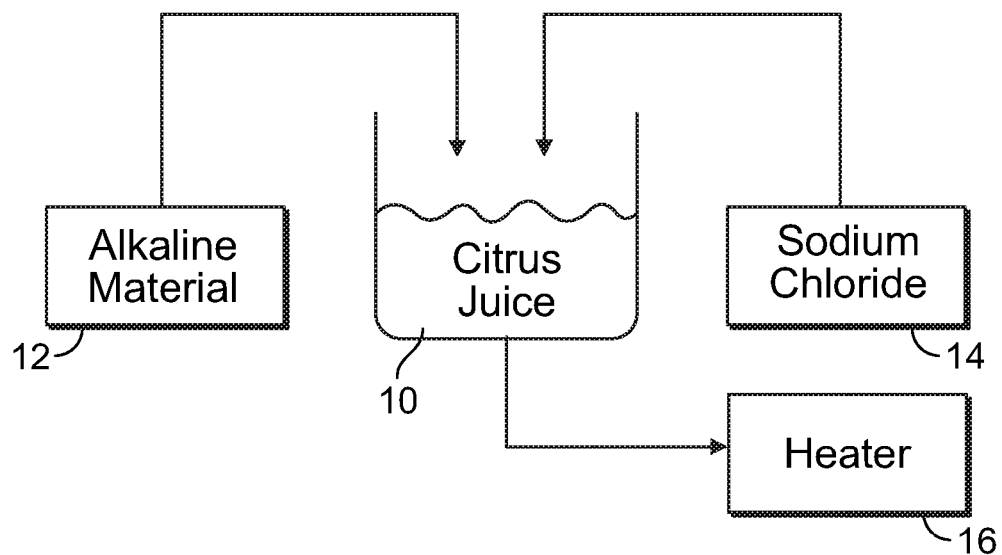

METHOD FOR MAKING CITRUS JUICE POWDER

CROSS-REFERENCE TO RELATED APPLICATIONS

This application claims the benefit of U.S. Provisional Patent Application No. 62/157,827, filed May 6, 2015, the contents of which are herein fully incorporated by reference.

FIELD OF THE INVENTION

This disclosure pertains to an improved method for making citrus juice powder, and particularly lemon juice powder. This disclosure also provides a citrus juice powder composition and a meat marinade.

BACKGROUND OF THE INVENTION

Citrus juice powder is used in many food applications, including in drinks and in meat marinades. Typical citrus fruits that are used to prepare such powders include lemons, limes, and oranges. Among these citrus fruits, the juice and juice powder prepared from lemons is generally the most acidic and is therefore generally the most desirable to use in applications where the highest level of acidity is desired.

One known method for making lemon juice powder (and other citrus juice powders) comprises extracting lemon juice from lemons (or other citrus fruits), adding maltodextrin as a bulking agent and/or filler, and subjecting the resulting slurry to heating in order to drive off the moisture and produce a powder product. The maltodextrin is believed to complex to non-volatile flavors, fragrances, and color components to protect them from degradation during the drying process. Unfortunately, current methods for making citrus juice powders may have a restricted throughput and may require large amounts of energy for heating.

Disclosed herein are improved methods employing citric acid containing fruits including lemon, pineapple, kiwi, and citric acid containing fruit combinations for making neutralized citrus juice powder and particularly neutralized powders of lemon juice, pineapple juice, and kiwi juice as well as the resulting neutralized citrus juice powder end products. Among the citric acid containing fruits, lemon and lemon juice is preferred.

BRIEF SUMMARY OF THE INVENTION

In one aspect, disclosed are methods of making a citrus juice powder. The methods may comprise providing an amount of citrus fruit juice; adding an alkaline material to the citrus fruit juice; mixing the alkaline material and citrus fruit juice to provide a neutralized citrus fruit juice mixture, wherein the neutralized citrus fruit juice mixture has a pH of from 7 to 11; and heating the neutralized citrus fruit juice mixture, wherein heating causes the solids of the neutralized citrus fruit juice mixture to dry onto a powder formation substrate and provide a citrus juice powder. The methods provide a citrus juice powder that is substantially free of fillers.

In another aspect, disclosed are citrus juice powders. The citrus juice powders may comprise a neutralized citrus fruit juice powder and a salt. The citrus juice powders are substantially free of fillers.

In another aspect, disclosed are meat marinades. The meat marinades may comprise marinade flavors/seasonings and a citrus juice powder, wherein the citrus juice powder is made by a method comprising: a) providing an amount of citrus fruit juice; b) adding an alkaline material to the citrus fruit juice; c) mixing the alkaline material and citrus fruit juice to provide a neutralized citrus fruit juice mixture, wherein the neutralized citrus fruit juice mixture has a pH of from 7 to 11; and d) heating the neutralized citrus fruit juice mixture, wherein heating causes the solids of the neutralized citrus fruit juice mixture to dry onto a powder formation substrate and provide a citrus juice powder.

BRIEF DESCRIPTION OF THE FIGURE DRAWINGS

FIG. 1 depicts an exemplary embodiment of the disclosed method, wherein the citrus juice is denoted as (10), the alkaline material is denoted as (12), the salt is denoted as (14) and the heating device is denoted as (16).

DETAILED DESCRIPTION OF THE INVENTION

Embodiments of the invention, together with objects and advantages thereof, may be best understood with reference to the following description, taken in conjunction with the attached flow diagram labeled "FIG. 1".

Embodiments of the disclosure comprise a more efficient process for making neutralized citrus juice powders, and in particular neutralized lemon juice powder. The disclosed citrus juice powder does not require bulking agents and/or fillers, such as, but not limited to, maltodextrin. Furthermore, the embodiments of the disclosure provide an improved end product that may dissolve more easily in water than previous citrus juice powders.

Embodiments of the invention also comprise methods for making neutralized citrus juice powders, including neutralized lemon juice powder having an improved end product, which is particularly well-suited for incorporation into marinades. Marinades comprising the neutralized citrus juice powder may be applied to meat, poultry or seafood in order to improve yield and tenderness. Such meat marinades may be applied by techniques including tumbling, injecting, massaging or a combination of these marination techniques.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "bulking agent and fillers" refers to materials whose general intended function includes increasing the bulk of said composition, such as maltodextrin.

As used herein, the term "substantially free" refers to compositions containing less than a functional amount of the indicated material, and also including zero percent by weight of such indicated material.

Method of Making a Citrus Juice Powder

Disclosed herein are methods of making a citrus juice powder. FIG. 1 illustrates an embodiment of the disclosed methods of making a citrus juice powder. The method may comprise providing an amount of fruit juice, for example a citrus juice (10). The citrus fruit juice may comprise water, natural sugars, citric acid, and ascorbic acid. The citrus fruit juice may further comprise pectin. The citrus fruit juice may comprise about 78% by weight or more of water and have a pH of about 2.1-2.4.

The fruit juice may be a citrus fruit juice from a citrus fruit source, which includes, inter alia, purées and concentrates. The citrus fruit source of the juice may be of any fruit having citric acid and/or ascorbic acid. For example, the citrus fruit juice may be, but is not limited to, lemon juice, lime juice, pineapple juice, kiwi juice, orange juice, clementine juice, kumquat juice, grapefruit juice or a combination thereof. In a preferred embodiment, the citrus fruit juice is lemon juice. In some embodiments, a citrus fruit concentrate or a citrus fruit purée may be used in lieu of or in combination with the citrus fruit juice. In some embodiments, pineapple, kiwi, and combinations thereof are preferred in view of their enzymatic functionality.

As shown in FIG. 1, the method may comprise adding a sufficient amount of a food grade alkaline material (12) to the citrus fruit juice in order to neutralize the citrus fruit juice. The alkaline material may be mixed with the citrus fruit juice to provide a neutralized citrus fruit juice mixture. The alkaline material may bring the pH of the citrus fruit juice mixture up to a range of about 7 to about 11. In a preferred embodiment, the alkaline material brings up the pH of the citrus fruit juice mixture to a range of about 8.5 to about 10.5. It has been found that the alkaline material preferably is added slowly to prevent a rapid rise in the temperature of the juice. It has also been found that once the addition of the food grade alkaline material is completed, the neutralized aqueous citrus fruit juice mixture and the forming citrus juice powder end product are far less subject to browning during the drying process than the unneutralized citrus materials employed in prior art processes.

The food grade alkaline material may be food grade sodium or potassium hydroxide, food grade potassium carbonate, food grade sodium carbonate or any other appropriate food grade alkaline material. In a preferred embodiment, the alkaline material is food grade sodium hydroxide. The alkaline material may be in the form of a concentrated aqueous solution in the range of about 40-50% by weight. For example, the alkaline material may be added to the citrus fruit juice as an aqueous solution having a solids content of from 40% to 50% by weight. In a preferred embodiment, the alkaline material is in the form of a concentrated aqueous solution in an amount of about 50% by weight, based on solids.

The method may further comprise adding a powder formation substrate to the citrus fruit juice. The powder formation substrate provides a substrate onto which the citrus fruit juice solids are dried onto during the heating step. The powder formation substrate may be a salt (14) added to the citrus fruit juice. The salt may be added before, after, at the same time, or a combination thereof in relation to the addition of the alkaline material. The salt may be sodium chloride. The salt may be added at a ratio to the solids content of the citrus fruit juice by weight of about 2:1 to about 1:4. In a preferred embodiment, the salt may be added at a ratio of 1:2 relative to the citrus fruit juice solids by weight.

In embodiments where a powder formation substrate is not added to the citrus fruit juice, citrus fruit juice solids may form onto salts produced during the neutralization reaction, and thus said salts provide the powder formation substrate. In some embodiments, the powder formation substrate is a salt of citric acid. For example, in an embodiment where a sodium-based alkaline material is added to a citrus juice, the neutralization reaction may produce large amounts of trisodium citrate solids, which will come out of solution during the drying process. Accordingly, in this embodiment, the fruit solids may form onto the trisodium citrate solids.

The method may also comprise adding flavor and/or essential oils to the citrus fruit juice, neutralized citrus fruit juice mixture, citrus juice powder or combination thereof.

The alkaline material and the optional salt are generally evenly distributed in the citrus fruit juice (or puree) by appropriately mixing the alkaline material, salt and citrus fruit juice. The alkaline material, citrus fruit juice and the salt are mixed to provide a neutralized citrus fruit juice mixture having a pH of from about 7 to about 11.

The neutralized citrus fruit juice mixture is then transported to a heating device (16) in which the water is driven off (e.g. a drying step), leaving a citrus juice powder and optionally sodium chloride crystals. The citrus juice powder is granular; for example, it may have relatively coarse particles as well as fine flour-like particles.

The neutralized citrus fruit juice mixture typically comprises a significant amount of water, and thus it is desirable to remove the water in the mixture in an efficient manner. For example, the method may comprise heating the neutralized citrus fruit juice mixture to provide a citrus juice powder. Heating the neutralized citrus fruit juice mixture allows the solids of the mixture to dry onto the powder formation substrate, for example a salt, upon removal of water to provide a citrus juice powder. Heating may be done, for example, using a drum dryer, a vacuum-assisted drum dryer, a fluid bed heater, or in a spray dryer. In embodiments where a drum dryer is used, it may be heated to a temperature above the boiling point of water so that the water in the mixture flashes off leaving citrus juice powder and salt crystals in the drum. The resulting product is ideally suited to use in savory products such as savory meat marinades.

In embodiments where spray drying and sodium chloride are used, the neutralized citrus fruit juice mixture may be atomized and allowed to fall by gravity without adhering to the walls of the spray dryer chamber, such that the dried citrus juice powder and salt collect at the bottom of the device. In this embodiment, an abrasion-resistant nozzle may be required to prevent damage by abrasive salt crystals exiting through the nozzle.

Citrus Juice Powder

Disclosed herein are improved citrus juice powders. The citrus juice powder may comprise a neutralized citrus fruit juice powder and a salt. In a preferred embodiment, the neutralized citrus fruit juice powder is lemon juice powder.

The citrus juice powder is substantially free of fillers. In particular, the citrus juice powder is free of maltodextrin. Accordingly, the citrus juice powders disclosed herein have a higher percent of fruit solids relative to prior juice powders that include fillers. Due to the absence of fillers, the citrus juice powder dissolves more quickly in water relative to a citrus juice powder with fillers. The citrus juice powder is also significantly less corrosive because its acidity has been neutralized. Furthermore, since all of the ingredients used are natural, the citrus juice powder is fully natural and ideally suited for use in natural savory products, such as natural savory meat marinades. In some embodiments, the citrus juice powder consists essentially of the neutralized citrus fruit juice powder and the salt.

The neutralized citrus fruit juice powder may comprise natural sugar and salts of citric acid and ascorbic acid. The neutralized citrus fruit juice powder may further comprise pectin. The neutralized citrus fruit juice powder may be lemon juice powder, lime juice powder, pineapple juice powder, kiwi juice powder, orange juice powder, clementine juice powder, kumquat juice powder, grapefruit juice powder or a combination thereof, with lemon juice powder being the preferred embodiment. The citrus juice powder may include the neutralized citrus fruit juice powder in an amount of from about 55% to about 75% by weight. In a preferred embodiment, the citrus juice powder may include the neutralized citrus fruit juice powder in an amount of about 60% to about 70% by weight.

The citrus juice powder may comprise an alkaline material. The alkaline material may be food grade sodium hydroxide, food grade potassium hydroxide, food grade potassium carbonate, food grade sodium carbonate or a combination thereof.

The neutralized citrus fruit juice powder may be dried onto the salt. The salt may be sodium chloride. The citrus juice powder may include the salt in an amount of from 25% to 45% by weight. In a preferred embodiment, the citrus juice powder may include the salt in an amount of from 30% to 40% by weight. The salt of the citrus juice powder may be present at a ratio of 2:1 to 1:4 relative to the neutralized citrus fruit juice powder by weight. In a preferred embodiment, the salt may be present at a ratio of 1:2 relative to the neutralized citrus fruit juice powder by weight.

In some embodiments, salt is not added to the citrus fruit juice during its method of making. In these embodiments, the citrus fruit juice solids may dry onto salts formed during the neutralization. For example, in an embodiment where a sodium-based alkaline material is added to a citrus juice, the neutralization reaction may produce large amounts of citric acid salts, such as trisodium citrate, which may come out of solution during the drying process. Accordingly, in this embodiment, the citrus fruit solids may dry onto the trisodium citrate.

Meat Marinade

Disclosed herein are also meat marinades containing citrus fruit juice powders prepared as described above. The meat marinades may also comprise marinade flavors and seasonings. The marinade flavors and seasonings may be any herbs, spices or other ingredients that provide the intended flavor profile of said marinade. The citrus juice powder may be made by a method comprising: a) providing an amount of citrus fruit juice; b) adding an alkaline material to the citrus fruit juice; c) mixing the alkaline material and citrus fruit juice to provide a neutralized citrus fruit juice mixture, wherein the neutralized citrus fruit juice mixture has a pH of from 7 to 11; and d) heating the neutralized citrus fruit juice mixture, wherein heating causes the solids of the neutralized citrus fruit juice mixture to dry onto a powder formation substrate and provide a citrus juice powder.

The meat marinade may be in the form of a water-based solution and/or suspension. The meat marinade will improve yield and tenderness of the intended meat (e.g., chicken, poultry, beef, etc.). These meat marinades may be considered to be natural under USDA rules.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. It should be understood that the illustrated embodiments are exemplary only, and should not be taken as limiting the scope of the invention.

What is claimed is:

1. A method of making a citrus juice powder, comprising:
   a) providing an amount of citrus fruit juice;
   b) adding an alkaline material to the citrus fruit juice;
   c) mixing the alkaline material and citrus fruit juice to provide a neutralized citrus fruit juice mixture, wherein the neutralized citrus fruit juice mixture has a pH of from 7 to 11;
   d) mixing the neutralized citrus fruit juice mixture and a powder formation substrate comprising sodium chloride to provide a citrus fruit juice and powder mixture; and
   e) heating the citrus fruit juice and powder mixture, wherein heating causes the solids of the citrus fruit juice and powder mixture to dry onto the powder formation substrate and provide a citrus juice powder substantially free of fillers.

2. The method of claim 1, wherein the sodium chloride is added at a ratio of 2:1 to 1:4 by weight relative to the solids of the citrus fruit juice.

3. The method of claim 1, wherein the powder formation substrate is a salt of citric acid.

4. The method of claim 1, wherein the citrus fruit juice comprises water in an amount of greater than 78% by weight.

5. The method of claim 1, wherein the citrus fruit juice is lemon juice, lime juice, orange juice, clementine juice, grapefruit juice or a combination thereof.

6. The method of claim 1, wherein the alkaline material is added as an aqueous solution having a solids content of from 40% to 50% by weight.

7. The method of claim 1, wherein the alkaline material is food grade sodium hydroxide, food grade potassium hydroxide, food grade potassium carbonate, food grade sodium carbonate or a combination thereof.

8. The method of claim 1, wherein the heating step is performed by a drum dryer, a vacuum-assisted drum dryer, a fluid bed heater, a spray dryer or a combination thereof.

9. The citrus juice powder of claim 1, wherein the citrus fruit juice is lemon juice.

10. A meat marinade comprising:
    marinade flavors and seasonings; and
    a citrus juice powder and sodium chloride mixture, wherein the citrus juice powder and sodium chloride mixture is substantially free of fillers and is made by a method comprising:
    a) providing an amount of citrus fruit juice;
    b) adding an alkaline material to the citrus fruit juice;

c) mixing the alkaline material and citrus fruit juice to provide a neutralized citrus fruit juice mixture, wherein the neutralized citrus fruit juice mixture has a pH of from 7 to 11;

d) mixing the neutralized citrus fruit juice mixture and a powder formation substrate comprising sodium chloride to provide a citrus fruit juice and powder mixture; wherein the sodium chloride is added at a ratio of 2:1 to 1:4 by weight relative to the solids of the citrus fruit juice and e) heating the citrus fruit juice and powder mixture, wherein heating causes the solids of the citrus fruit juice and powder mixture to dry onto the powder formation substrate and provide the citrus juice powder and sodium chloride mixture.

11. The meat marinade of claim 10, wherein the powder formation substrate includes a salt of citric acid.

12. The meat marinade of claim 10, wherein the citrus fruit juice comprises water in an amount of greater than 78% by weight.

13. The meat marinade of claim 10, wherein the citrus fruit juice is lemon juice, lime juice, orange juice, clementine juice, grapefruit juice or a combination thereof.

14. The meat marinade of claim 10, wherein the alkaline material is added as an aqueous solution having a solids content of from 40% to 50% by weight.

15. The meat marinade of claim 10, wherein the alkaline material is food grade sodium hydroxide, food grade potassium hydroxide, food grade potassium carbonate, food grade sodium carbonate or a combination thereof.

16. The meat marinade of claim 10, wherein the heating step is performed by a drum dryer, a vacuum-assisted drum dryer, a fluid bed heater, a spray dryer or a combination thereof.

* * * * *